C. S. SMITH.
FILTERING APPARATUS.
APPLICATION FILED AUG. 7, 1913. RENEWED JUNE 13, 1918.
1,293,650. Patented Feb. 4, 1919.
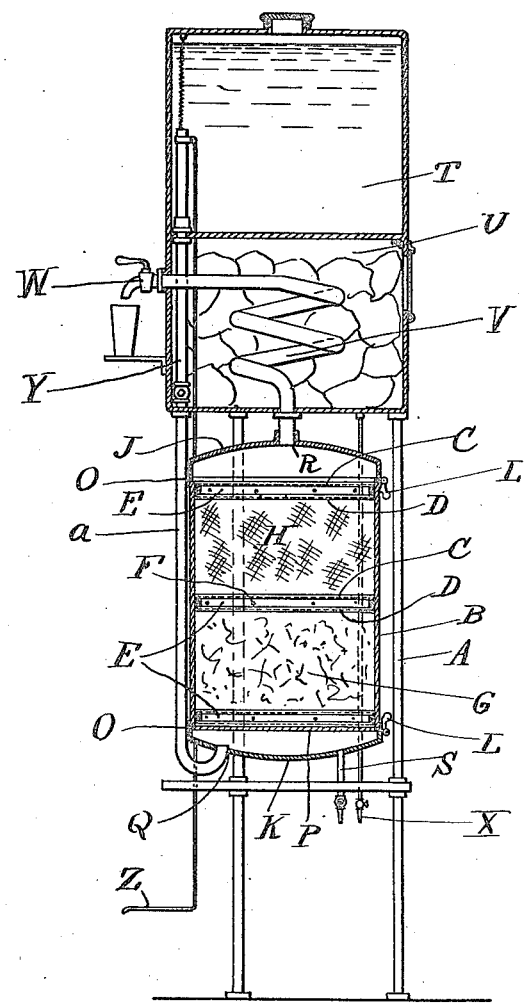

UNITED STATES PATENT OFFICE.

CAROLYN S. SMITH, OF BROOKLYN, NEW YORK.

FILTERING APPARATUS.

1,293,650.    Specification of Letters Patent.    Patented Feb. 4, 1919.

Application filed August 7, 1913, Serial No. 783,542. Renewed June 13, 1918. Serial No. 239,893.

*To all whom it may concern:*

Be it known that I, CAROLYN S. SMITH, a citizen of the United States of America, and a resident of the borough of Brooklyn, county of Kings, city and State of New York, have invented certain new and useful Improvements in Filtering Apparatus, of which the following is a specification accompanied by drawings.

This invention relates to filtering apparatus, more particularly to portable filtering apparatus, although some of the features of the invention may be applied to various types of apparatus.

The objects of the invention are to produce an apparatus which is simple and efficient, readily transported from place to place and suitable for office and home use and capable of being easily adjusted and cleaned.

The invention is illustrated in one of the best forms known to me in the accompanying drawing, which is an elevation partly in longitudinal section.

Referring to the drawing, A represents a suitable frame or stand, preferably of such character that the filtering apparatus is portable. The filtering tank B is preferably removably supported in the stand, so that it may be readily cleaned and to permit the filtering material to be renewed. The filtering means in the tank is preferably adapted to set up sufficient galvanic action in the water to aid in purifying the water. Galvanic couples are formed in the tank by means of wire mesh gauze or nettings of different metals, as brass and aluminum, having their edges in contact, the mesh to be substantially fine, as No. 60. These galvanic couples are in the form of transverse partitions, constructed by spreading the wire mesh C and D over a holding or clamping ring E, so that the ends of the portions of wire mesh are in contact. The ring and gauze carried thereby are placed in the tank and the rings E are provided with the holes F to enable the partitions to be manipulated into position and withdrawn when desired. The edges of the wire mesh portions are clamped between the rings E and the sides of the tank or container. Three partitions are illustrated, and the galvanic action in the tank is more efficient if the character of the metals forming the wire meshes is alternated throughout the series of partitions. The wire mesh portions C of one metal, as brass, alternate with the mesh portions D of aluminum. To increase the purity, I prefer to use additional filtering material, as carbon G in one portion of the tank and flint H in another portion.

The galvanic action seems to be increased if the water is forced into the tank under pressure and I prefer to force the water in at the bottom and withdraw it at the top. The temperature of the tank should also not be too low, preferably not below about 40° F. so that ice should not be packed around the tank, because this seems to retard or destroy the galvanic action.

In the mechanical construction of the apparatus, heads or end portions J and K may be provided suitably connected to the frame, and the tank proper B may be inserted between the heads and removably held in position by means of suitable clamps L. Rubber gaskets O are preferably inserted between the heads and the tank, and the bottom head K is preferably of magnetized metal which is insulated from the tank B by the gasket O. The magnetic attraction exerted by the head K tends to aid in drawing impurities to the bottom, as for instance, metallic particles. If desired, a partition P of fibrous material as asbestos may be inserted between the head K and the tank B or in the lower portion of the apparatus, which serves to catch the sediment and impurities and may be renewed when necessary. I prefer to arrange the tank vertically, and the inlet Q is attached to the lower head K, while the outlet R is attached to the upper head J, and these connections are not disturbed by the insertion and removal of the tank B. The draw-off or drain pipe S is preferably arranged at one side of the bottom as shown and the inlet Q at the other side, so that in cleaning the apparatus, the current of water is forced across the bottom.

The water reservoir T is preferably arranged at the top of the apparatus, and a cooling chamber U is arranged intermediate the reservoir T and the tank B, and preferably provided with a coil V which may be embedded in ice, and is connected to the outlet R. The draw-off cock W is at the side of the apparatus, and the drain X for the cooling chamber extends to the lower portion of the frame. A pump cylinder Y receives water from the reservoir T and its spring retracted plunger may be manipulated by the foot of the operator as by means of the treadle connected to the plunger. The arrangement is such that each time that the treadle Z is pressed downward, a measured quantity of water enters the cylinder Y and is forced under pressure through the pipe $a$ connecting with the inlet Q into the tank. The quantity of water so forced may be about one glassful or more, and may be withdrawn from the cock W at once or the cock W may be opened before the pump plunger is operated, so that the water is forced directly into the glass. The tank may be pumped up under pressure by several strokes of the pump and thus maintained under pressure, if desired.

I claim and desire to obtain by Letters Patent the following:

1. A self-contained portable filtering apparatus, comprising a frame or stand, a filter tank supported by said stand, a water reservoir supported by said stand, a pump connected to receive water from the reservoir, a plunger for the pump, retracting means for the plunger, a connection between the pump and the inlet of the filter tank, and manual means for actuating the plunger, thereby forcing measured quantities of water from said water reservoir into said filter tank.

2. A self-contained portable filtering apparatus, comprising a frame or stand, a filter tank supported by said stand and having an inlet at its bottom, a water reservoir supported by the stand above the filter tank, a pump cylinder connected to receive water from the reservoir, a spring retracted plunger for said pump cylinder, a connection between said pump cylinder and the inlet at the bottom of the filter tank, and manual means for actuating said plunger, thereby forcing measured quantities of water from said water reservoir into said filter tank.

In testimony whereof I have signed this specification in the presence of two subscribing witnesses.

CAROLYN S. SMITH.

Witnesses:
 HERBERT G. OGDEN,
 M. M. RIEMANN.